United States Patent
Bormann et al.

[11] Patent Number: 5,104,040
[45] Date of Patent: Apr. 14, 1992

[54] BUTT JOINT DEVICE

[75] Inventors: Uwe Bormann, Rümmingen; Dieter Goerner, Hausein i.w., both of Fed. Rep. of Germany

[73] Assignee: Wampfler GmbH, Weil am Rhein-Maerkt, Fed. Rep. of Germany

[21] Appl. No.: 501,549

[22] Filed: Mar. 30, 1990

[30] Foreign Application Priority Data

Apr. 1, 1989 [DE] Fed. Rep. of Germany ... 8903978[U]

[51] Int. Cl.$^5$ .................. E01B 11/00; E01B 9/00; E01B 13/00; E01B 25/22
[52] U.S. Cl. .................. 238/151; 238/183; 238/343; 238/161.5; 238/179; 238/225; 238/249; 238/310; 104/110; 104/111; 104/89; 104/93
[58] Field of Search .................. 104/93, 94, 106, 107, 104/108, 109, 110, 111, 130, 95; 238/179, 183, 184, 262, 263, 175, 161, 161.5, 299, 324, 335, 342, 343, 249, 151, 255, 225, 226; 403/297, 314, 312

[56] References Cited

U.S. PATENT DOCUMENTS

| | | | |
|---|---|---|---|
| 796,736 | 8/1905 | Lamb | 238/343 |
| 853,554 | 5/1907 | Kost | 238/343 |
| 1,056,658 | 3/1913 | Fussell | 238/183 |
| 1,396,564 | 11/1921 | Fechner | 104/111 |
| 4,393,785 | 7/1983 | Hörtnagel | 104/110 |

Primary Examiner—Joseph F. Peters, Jr.
Assistant Examiner—Kenneth Lee
Attorney, Agent, or Firm—Pascal & Associates

[57] ABSTRACT

Apparataus for butt joining hanging conveyor supports having a C-shaped rail section in which conveying hangers can travel back and forth along the rail section. The supports each have a hollow section above the rail section and trolley wires running along at least one vertical side of the supports. Connecting parts are disposed between ends of adjacent supports, the hollow section having at least one profiled section in the shape of a square standing on a point. A square tube connects the ends and bridges the connecting parts and are inserted into the profiled sections at the ends of adjacent supports. Tie rods connect the ends of the adjacent supoorts. At least one L-shaped angle iron is disposed on each of the top sides of the ends of adjacent supports. The angle irons are connected to one another via at least one screw bolt and act, on both vertical sides of the ends of adjacent supports, on the tie rods which connect the ends together. With the above structure extended lengths of conveyor rail systems can be provided with continuous gas and electrical power along the conveyor.

21 Claims, 4 Drawing Sheets

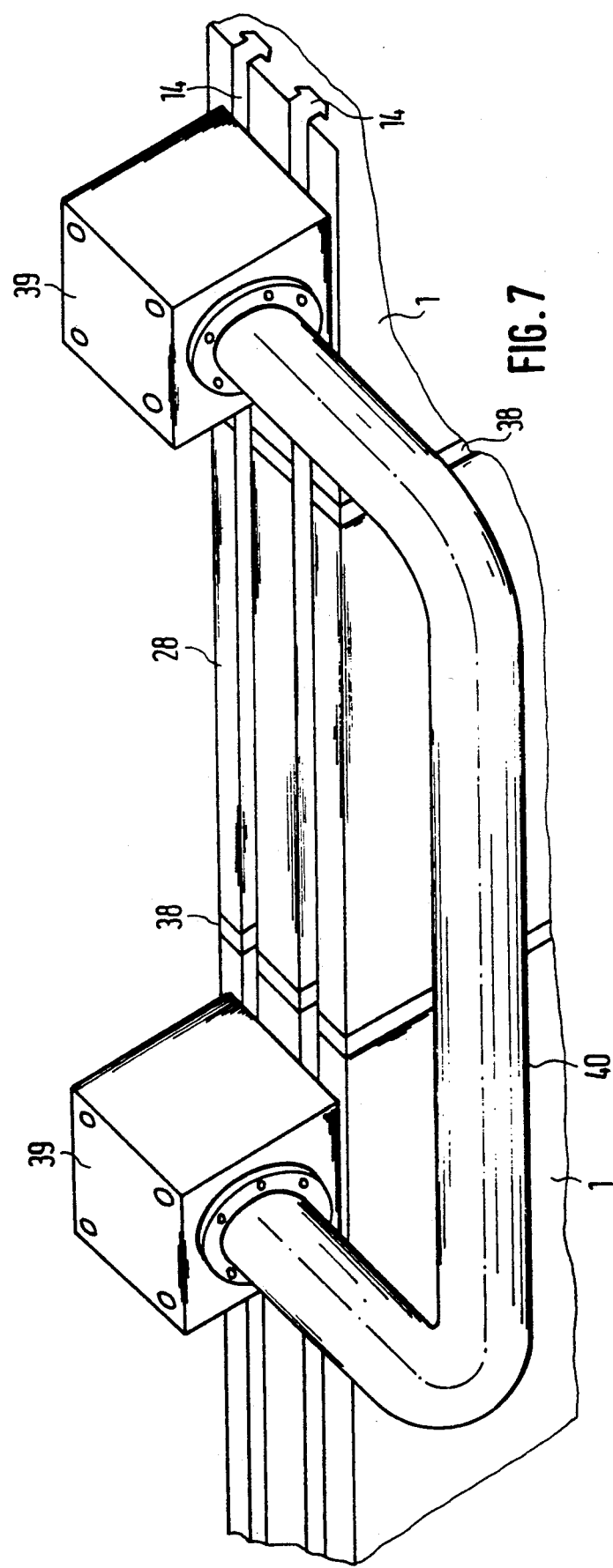

BUTT JOINT DEVICE

FIELD OF THE INVENTION

This invention relates to the field of conveyors, and particularly to a butt joining device for a hanging conveyor rail.

BACKGROUND TO THE INVENTION

In a recently developed conveying system of the assignee, supports are provided which have a shaped section on their undersides along which conveyor hangers can travel back and forth on rollers. At the vertical sides of the supports, longitudinally running trolley wires are provided. Conveyor belts and guideways run parallel to the trolley wires; trolley carriages, which engage with the trolley wires by sliding contacts, can travel back and forth along the conveyor belts and guideways. Tools, with which articles are worked, that are fastened to the conveying hangers, can be hung on the trolley carriages. Moreover, the supports contain a hollow which is connected to a pressure gas source. In this way, consuming devices can be supplied with pressure gas by pressure gas connections attached to the supports.

Since these supports can only be made with a limited length, it is necessary to butt and connect adjacent supports to one another at their points of contact. Due to the various tasks that the above-noted supports assume, it is necessary to make the butt joints appropriately mechanically stable and tight. The butt joints should, in addition, meet electrical regulations, enable an electrical current feed across the joints and make it possible to expand the conveying system.

SUMMARY OF THE INVENTION

The above is achieved in accordance with a preferred embodiment of the invention, which is an apparatus for butt joining hanging conveyor supports having a C-shaped rail section in which conveying hangers can travel back and forth along the rail section, the supports each having a hollow section above the rail section and trolley wires running along at least one vertical side of the supports, connecting parts being disposed between ends of adjacent supports, the hollow section having at least one profiled section in the shape of a square standing on a point, a square tube for connecting the ends and bridging the connecting parts being inserted into the profiled section at the ends of adjacent supports, tie rods connecting the ends of the adjacent supports, at least one L-shaped angle iron being disposed on each of the top sides of the ends of adjacent supports, the angle irons being connected to one another via at least one screw bolt and acting, on both vertical sides of the ends of adjacent supports on the tie rods which connect the ends together.

BRIEF INTRODUCTION TO THE DRAWINGS

Embodiments of the invention are described in greater detail below, with reference to the drawings, in which:

FIG. 7 is a perspective view onto a by-pass line bridging a butt joint.

DESCRIPTION OF A PREFERRED EMBODIMENT

Figure 1:
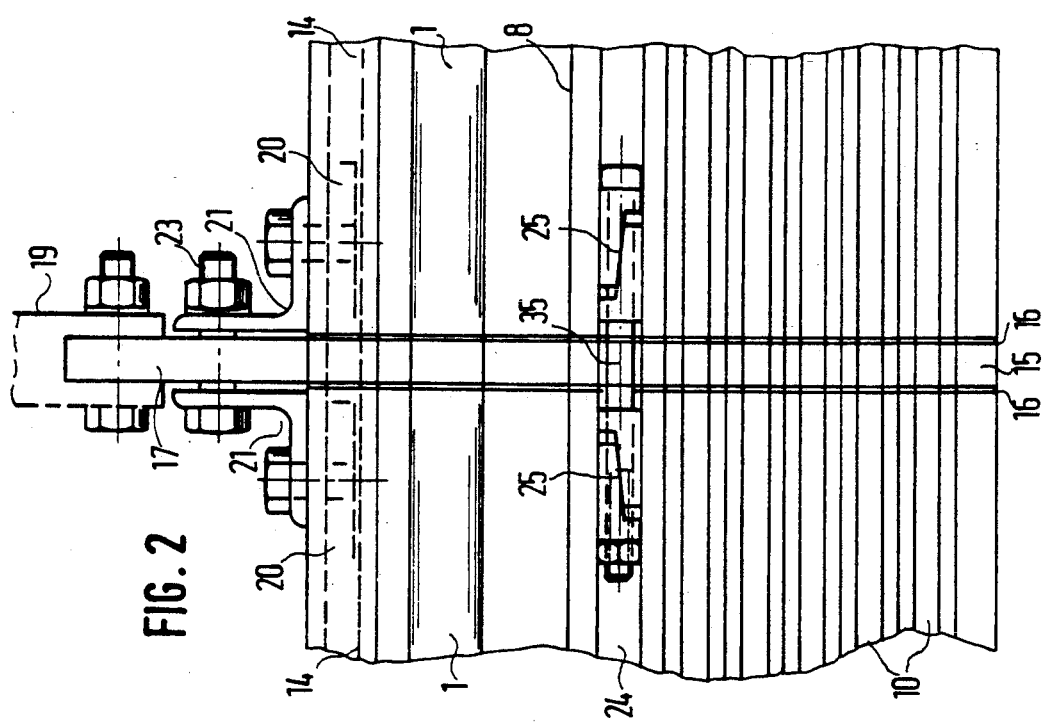
FIG. 1 is a section through a support.

Supports 1 have an essentially rectangular cross-section. A C-shaped rail section 2, along which rollers 3 of a conveying hanger 4 can travel back and forth, is provided on the underside of the supports 1. Above the C-shaped rail section 2, the supports have an elongated hollow 5 which is, for example, connected to a compressed air source. Moreover, supporting and conveying tracks 6, 7, 8 are provided along which a trolley carriage 9 can travel back and forth. In the region of the trolley carriage 9, support 1 has trolley line grooves 10 into which trolley lines 11, which are insulated from one another, are inserted. Sliding contacts 12 of trolley carriage 9 are in contact with the trolley wires 11.

The hollow 5 has two profiled sections 13, each of which forms a square standing on a point, situated vertically one below the other. In addition, two dovetailed grooves 14 are provided on the top side of the supports 1.

A fastening plate 15, whose cross-section corresponds to the cross-section of support 1 (except as noted below), is inserted between the ends of two adjacent supports 1. In each case, seals 16 are placed between fastening plate 15 and the ends of adjacent supports 1; the cross-section of each seal 16 also corresponds to the cross-section of support 1. At the top, fastening plate 15 has an extension 17 which projects beyond supports 1 and which is provided with two mounting bores 18 with which fastening plate 15 can be fastened to a supporting structure 19 which, in turn, is fastened, for example, to a ceiling.

Grooved insulators 14 are inserted into grooves 14 at the ends of adjacent supports 1. Grooved insulators 20 are each provided with a tapped hole with which L-shaped angle irons 21 can be clamped to the support ends via screws. The upright sides of angle iron 21 each have a bore 22 which align with a bore of fastening plate 15. A screw 23 is led through each of these bores 22, by means of which angle irons 21 can be clamped against one another and with that the ends of supports 1 against fastening plate 15.

Figure 6:
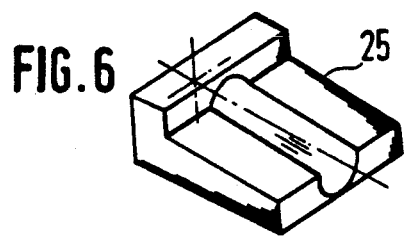
FIG. 6 is a perspective view of a clamping wedge used for the connection.

Grooves 24, which are rectangular in cross-section, are provided between the top trolley wire groove and conveying track 8 in the sides of each of the supports 1. Two opposite clamping wedges 25 (see also FIG. 6) are inserted into each of these grooves 24 at the ends of supports 1, whereby each clamping wedge pair is connected to one another via a tie rod 35 which bridges fastening plate 15. If the tie rod 35 is screwed to a nut, then clamping wedges 25 lock in their groove 24, as a result of which the ends of supports 1 are pressed against fastening plate 15. Grooves 24 are located just below the level of the center of gravity 26 of supports 1.

Square tubes 27, which bridge fastening plate 15 and which are used to transmit the load and as well center supports 1 and fastening plate 15, are inserted into the profiled sections 13 at the ends of adjacent supports 1.

Thus, a butt joint is created at which adjacent supports 1 are suspended, and at which all occurring load moments are transmitted, which enables insertion of continuous trolley wires 11 and which, moreover, seals hollow 5 on the outside.

Figure 2:
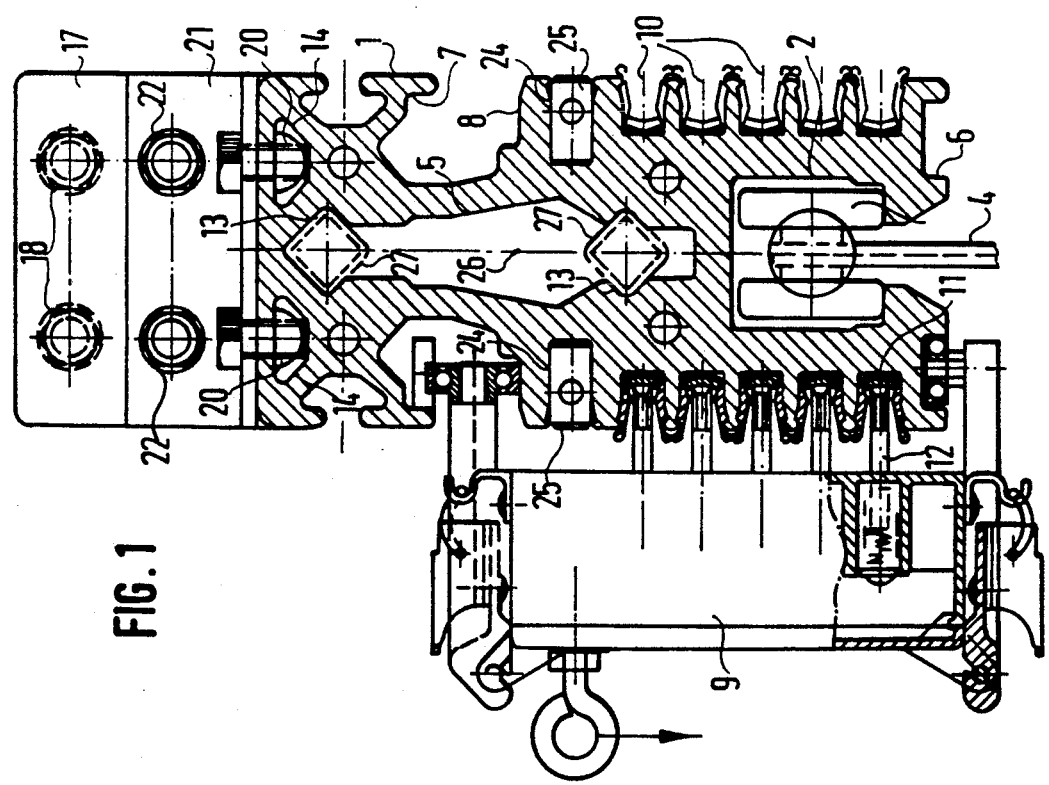
FIG. 2 is a side view onto the ends of two adjacent supports in a first embodiment illustrating a butt joint.
Figure 3:
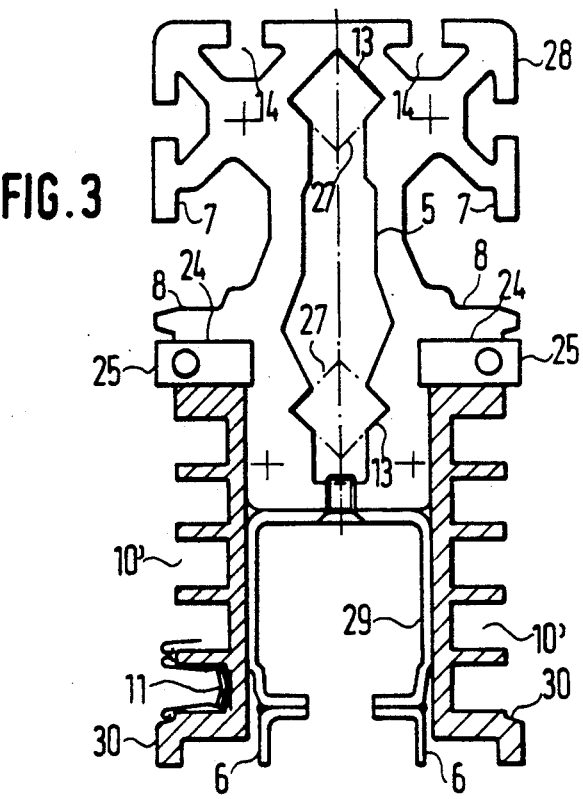
FIG. 3 is a section through a second embodiment illustrating a butt joint.
Figure 4:
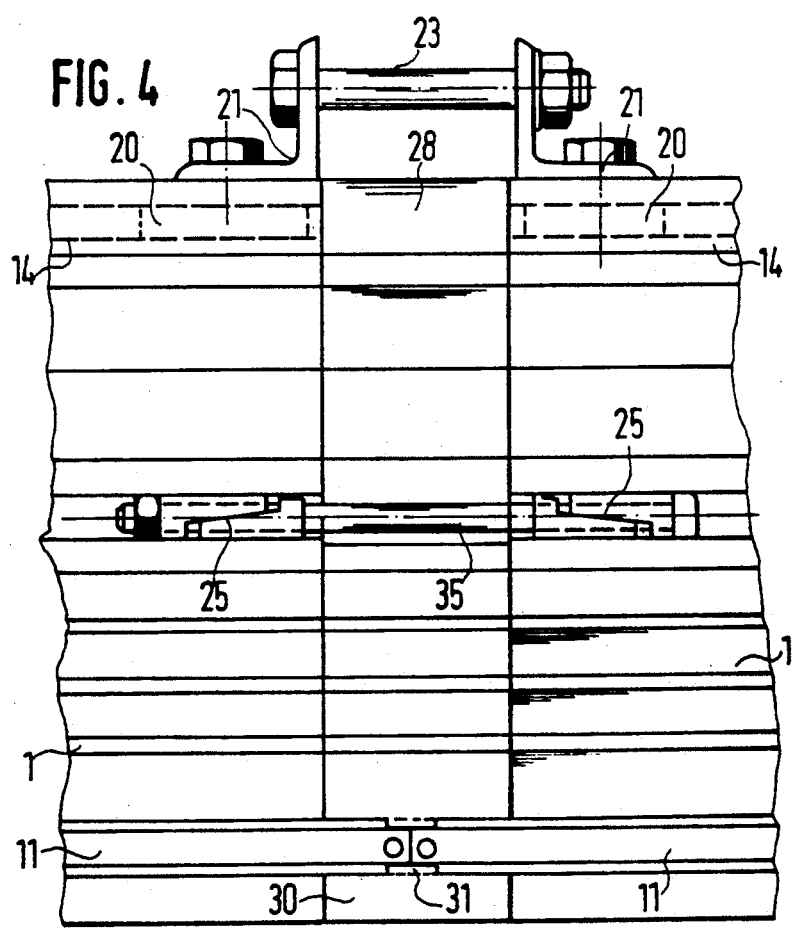
FIG. 4 is a side view corresponding to FIG. 2 of the second embodiment.

With the butt joint shown in FIGS. 3 and 4, the same conditions are essentially present as with the butt joint shown in FIGS. 1 and 2, but with the following differences.

Connecting part 28 is made wider than fastening plate 15 and does not have an extension on its top side. Thus, it is flush with the top side of supports 1. Moreover, there is no C-shaped rail section 2. Instead of this rail section, a so-called C-rail 29 is fastened to the underside of connecting part 28. Furthermore, there are no trolley wire grooves 10. Instead, an insulating part 30 is provided on each side which also has trolley wire grooves 10'.

At their ends in the region of insulating part 30, the live rails projecting beyond the ends of support 1 are electrically connected to one another via connector parts 31 on each side of the supports 1. Insulating parts 30 are used for insulation since creepage paths at the joints in extensions must be attained.

In all other respects, the connection between the ends of adjacent supports takes place as described above by means of angle irons 21, screws 23, clamping wedges 25 and tie rods 35.

Figure 5:
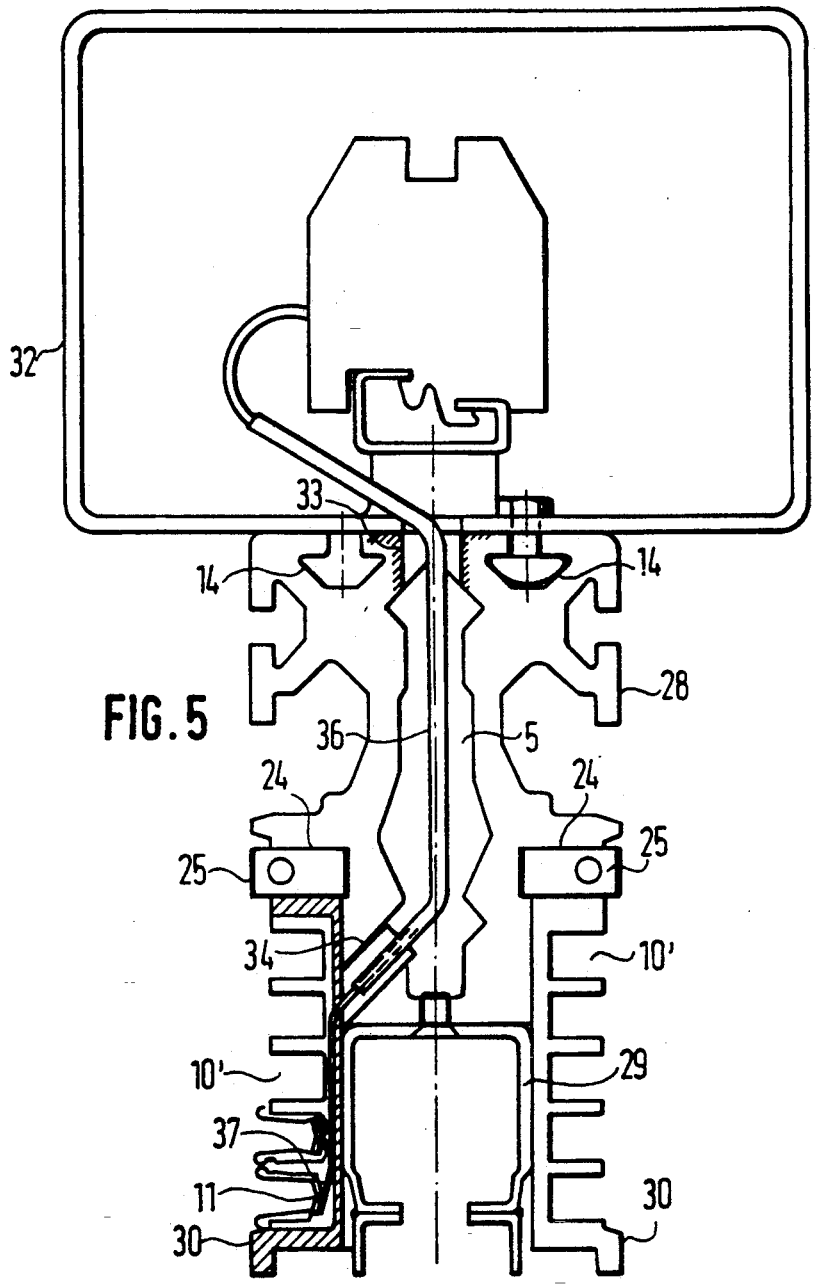
FIG. 5 is a section through a butt joint used for feeding the current.

The butt joint in FIG. 5 corresponds to the one in FIGS. 3 and 4. It is, however, simultaneously used for feeding current with great lengths of trolley wires.

A distributor box 32 is fastened to the support 1 via one of the dovetailed grooves 14. Bores 33 are provided beside one another in longitudinal direction on the top of connecting part 28; the number of bores 33 is equal to the number of trolley wires 11 to be provided. These bores 33 extend in the hollow 5. Moreover, diagonally extending bores 34 are provided in the region of insulating part 30; the number of the bores 34 also corresponds to the number of trolley wires 11 to be provided. Feed lines 36, which each run from the distributor box 32 to one of the trolley wires 11, are led through bores 33, 34 and hollow 5. A soldered joint 37 makes the electrical connection between a feed line 26 and a trolley wire 11. In order to seal hollow 5, bores 33, 34 are each filled with a synthetic substance which seals bores 33, 34.

Instead of this filling, hollows 5 can also be sealed by an intermediate plate at the ends of supports 1; these intermediate plates have the shape of connecting part 28 with the exception of the hollow 5. These kinds of intermediate plates 38 are shown in FIG. 7. In order to then be able to connect hollows 5 of adjacent supports 1, gas connections 39 are provided on the top sides of the supports; the gas connections 39 are connected to hollows 5 and are connected to one another via a by-pass line 40.

We claim:

1. Means for butt joining hanging conveyor supports comprising a C-shaped rail section containing an internal track on which conveying hangers can travel back and forth, conveyor supports each having a hollow section above the rail section and trolley wires running along at least one vertical side of the supports, ends of adjacent supports having connecting parts disposed therebetween, the hollow section having at least one profiled section in the shape of a square standing on a point, a square tube for connecting the ends and bridging the connecting parts being inserted into the profiled sections at the ends of adjacent supports, tie rods connecting the ends of the adjacent supports for pressing the supports together, a top side of each end of adjacent supports having at least one L-shaped angle iron disposed thereon, said angle irons being connected to one another via at least one screw bolt and acting, on both vertical sides of the ends of adjacent supports, on said tie rods which connect the ends together.

2. Means for butt joining as defined in claim 1, in which each connecting part is a fastening plate which has an extension projecting beyond the supports and containing at least one mounting bore.

3. Means for butt joining as defined in claim 1 or 2, in which the supports contain dovetail grooves on the top sides thereof in which grooved insulators engage which are screwed to the L-shaped angle irons.

4. Means for butt joining as defined in one of claims 1 or 2, in which the vertical sides of the supports contain rectangular grooves, two opposite clamping wedges each being inserted into the rectangular grooves at the ends of adjacent supports, the rods extending between each of two opposite clamping wedges of a pair of two opposite clamping wedges.

5. Means for butt joining as defined in claim 4, in which the rectangular grooves extend at about the level of the center of gravity of the supports.

6. Means for butt joining as defined in one of claims 1 or 2, in which two of said profiled sections are provided which are vertically spaced from one another, a square tube being inserted into each of said profiled sections bridging the connecting parts.

7. Means for butt joining as defined in one of claims 1 or 2, the C-shaped rail section and trolley wire grooves being recessed in the connecting part, the connecting part having a bottom side, a C-rail and an insulating part on each side of the C-rail having a trolley wire groove and being fastened to the bottom side of the connecting part.

8. Means for butt joining as defined in claim 7, further comprising a distributor, and feed lines, staggered in longitudinal direction, passing through the connecting part from the distributor to each trolley wire.

9. Means for butt joining as defined in claim 8, in which the distributor is located on the connecting part such that the feed lines run essentially vertically through the connecting part.

10. Means for butt joining as defined in claim 8, comprising a lead-in and lead-out bores for carrying feed lines opening into the hollow of the connecting part and being filled with synthetic sealing material.

11. Means for butt joining as defined in claim 8, in which the hollows at the ends of adjacent supports are sealed off by an intermediate plate, a by-pass line running outside of the connecting part connecting the hollows of adjacent supports to each other.

12. Means for butt joining as defined in one of claims 1 or 2, in which the connecting parts have hollows corresponding to the hollows of the supports, seals being disposed between the support ends and connecting parts.

13. Means for butt joining as defined in claim 12, in which the seals consist of O-rings partially situated in grooves in the ends of the supports.

14. Means for butt joining as defined in claim 3, in which the vertical sides of the supports contain rectangular grooves, two opposite clamping wedges each being inserted into the rectangular grooves at the ends of adjacent supports, tie rods extending between each of two opposite clamping wedges of a pair of two opposite clamping wedges.

15. Means for butt joining as defined in claim 14, in which the rectangular grooves extend at about the level of the center of gravity of the supports.

16. Means for butt joining as defined in claim 3, the C-shaped rail section and trolley wire grooves being recessed in the connecting part, the connecting part having a bottom side, a C-rail and an insulating part on each side of the C-rail having a trolley wire groove and being fastened to the bottom side of the connecting part.

17. Means for butt joining as defined in claim 4, the C-shaped rail section and trolley wire grooves being recessed in the connecting part, the connecting part having a bottom side, a C-rail and an insulating part on each side of the C-rail having a trolley wire groove and being fastened to the bottom side of the connecting part.

18. Means for butt joining as defined in claim 16, further comprising a distributor, and feed lines, staggered in longitudinal direction, passing through the connecting part from the distributor to each trolley wire.

19. Means for butt joining as defined in claim 17, further comprising a distributor, and feed lines, staggered in longitudinal direction, passing through the connecting part from the distributor to each trolley wire.

20. Means for butt joining as defined in claim 9, comprising lead-in and lead-out bores for carrying feed lines opening into the hollow of the connecting part being filled with synthetic gas-impervious material.

21. Means for butt joining as defined in claim 9, in which the hollows at the ends of adjacent supports are sealed off by and intermediate plate, a by-pass line running outside of the connecting part connecting the hollows of adjacent supports to each other.

* * * * *